(12) United States Patent
Enomoto et al.

(10) Patent No.: US 10,693,112 B2
(45) Date of Patent: Jun. 23, 2020

(54) BATTERY MODULE

(71) Applicant: Panasonic Intellectual Property Management Co., Ltd., Osaka (JP)

(72) Inventors: Takeshi Enomoto, Osaka (JP); Keisuke Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 270 days.

(21) Appl. No.: 15/743,454

(22) PCT Filed: Dec. 20, 2016

(86) PCT No.: PCT/JP2016/005193
§ 371 (c)(1),
(2) Date: Jan. 10, 2018

(87) PCT Pub. No.: WO2017/125985
PCT Pub. Date: Jul. 27, 2017

(65) Prior Publication Data
US 2018/0205048 A1    Jul. 19, 2018

(30) Foreign Application Priority Data

Jan. 21, 2016 (JP) ................................. 2016-009787
Mar. 24, 2016 (JP) ................................. 2016-059375
Aug. 24, 2016 (JP) ................................. 2016-163457

(51) Int. Cl.
*H01M 2/10* (2006.01)
*H01M 10/653* (2014.01)
(Continued)

(52) U.S. Cl.
CPC ............. *H01M 2/105* (2013.01); *H01M 2/08* (2013.01); *H01M 2/204* (2013.01);
(Continued)

(58) Field of Classification Search
CPC ........... H01M 10/00–0587; H01M 10/60–627; H01M 10/64–643; H01M 10/65–6553; H01M 2/10–1055; H01M 2/12–18
See application file for complete search history.

(56) References Cited

U.S. PATENT DOCUMENTS 8,291,567 B1 * 10/2012 Keenan ................. B65D 71/70
29/407.09
2009/0104516 A1 * 4/2009 Yoshihara ............. H01M 2/105
429/149
(Continued)

FOREIGN PATENT DOCUMENTS

JP      2006-339017       12/2006
JP      2009-021223        1/2009
(Continued)

OTHER PUBLICATIONS

International Search Report of PCT application No. PCT/JP2016/005193 dated Mar. 21, 2017.

*Primary Examiner* — Jonathan G Leong
*Assistant Examiner* — Jacob Buchanan
(74) *Attorney, Agent, or Firm* — McDermott Will & Emery LLP (57) ABSTRACT

A battery module includes: cells; and a battery holder made of a resin material that contains a filler in a resin matrix. In the resin material of the battery holder, the lower limit of the content of the filler is determined on the basis of the endothermic amount, and the upper limit of the content of the filler is determined on the basis of the viscosity. Another battery module includes: cylindrical cells; and a battery holder having a plurality of tubular first accommodation portions each having a substantially hexagonal hole and a plurality of tubular second accommodation portions each having a substantially polygonal (heptagonal or more) hole. In the battery holder, the first accommodation portions and
(Continued)

second accommodation portions are arranged in a manner of log pile by sandwiching a first column including the first accommodation portions between second columns including the second accommodation portions.

6 Claims, 5 Drawing Sheets (51) Int. Cl.
| | |
|---|---|
| *H01M 10/643* | (2014.01) |
| *H01M 10/658* | (2014.01) |
| *H01M 10/617* | (2014.01) |
| *H01M 10/0525* | (2010.01) |
| *H01M 2/20* | (2006.01) |
| *H01M 2/08* | (2006.01) |
| *H01M 6/44* | (2006.01) |

(52) U.S. Cl.
CPC ..... *H01M 10/0525* (2013.01); *H01M 10/617* (2015.04); *H01M 10/643* (2015.04); *H01M 10/653* (2015.04); *H01M 10/658* (2015.04); *H01M 6/44* (2013.01)

(56) References Cited

U.S. PATENT DOCUMENTS

| | | | |
|---|---|---|---|
| 2010/0183910 A1 | 7/2010 | Nishino et al. | |
| 2011/0070476 A1 | 3/2011 | Takahashi et al. | |
| 2015/0155529 A1* | 6/2015 | Hamada | H01M 2/10 429/156 |
| 2016/0285143 A1* | 9/2016 | Rief | H01M 2/1055 |
| 2017/0018750 A1* | 1/2017 | Wintner | H01M 2/206 |

FOREIGN PATENT DOCUMENTS

| | | |
|---|---|---|
| JP | 2010-165597 | 7/2010 |
| JP | 2012-119136 | 6/2012 |

* cited by examiner

BATTERY MODULE

This application is a U.S. national stage application of the PCT international application No. PCT/JP2016/005193 filed on Dec. 20, 2016, which claims the benefit of foreign priority of Japanese patent application No. 2016-009787 filed on Jan. 21, 2016, Japanese patent application No. 2016-059375 filed on Mar. 24, 2016, and Japanese patent application No. 2016-163457 filed on Aug. 24, 2016, the contents all of which are incorporated herein by reference.

TECHNICAL FIELD

The present disclosure relates to a battery module.

BACKGROUND ART

Conventionally, a battery module has been known which includes: a plurality of cylindrical cells; and a battery holder including a plurality of cylindrical accommodation portions for respectively accommodating the cells (for example, Patent Literature 1). In the battery module disclosed in Patent Literature 1, in order to equalize the temperatures of the cells accommodated in the battery holder, the thermal capacity of the battery holder is designed to be larger on the center side of the holder than on the outer side thereof.

CITATION LIST

Patent Literature

PTL 1: Unexamined Japanese Patent Publication No. 2012-119136

SUMMARY OF THE INVENTION

When an abnormality has occurred in some cells accommodated in a battery holder, the heat generated in the some cells is conducted to other normal cells adjacent to the some cells, and can degrade the normal cells. In a battery module including a plurality of cells, it is an important issue to prevent such a trouble of heat conduction without increasing the size of the battery holder.

A battery module of the present disclosure includes: a plurality of cells; and a battery holder including a plurality of accommodation portions that respectively accommodate the cells and are separated from each other by partitions. The battery holder is made of a resin material that contains a filler in a resin matrix. In the resin material, the lower limit of the content of the filler is determined on the basis of the endothermic amount, and the upper limit of the content of the filler is determined on the basis of the viscosity.

A battery module of the present disclosure includes: a plurality of cylindrical cells; and a battery holder including a plurality of tubular accommodation portions for respectively accommodating the cylindrical cells. The battery holder includes, as the accommodation portions, a plurality of first accommodation portions each of which has a substantially hexagonal hole and a plurality of second accommodation portions each of which has a substantially polygonal (heptagonal or more) hole. The first accommodation portions and second accommodation portions are arranged in a manner of log pile. For this objective, second columns including the plurality of second accommodation portions are disposed on the opposite sides in the battery holder so that a first column including the plurality of first accommodation portions is sandwiched between the second columns.

In the battery module of the present disclosure, the heat quantity that is conducted from a cell having undergone an abnormal heat generation to a normal cell can be reduced while a sufficient mounting efficiency of the cells is kept. The battery module of the present disclosure has a high fire-spreading prevention performance.

DESCRIPTION OF EMBODIMENT(S)

As discussed above, in a battery module including a plurality of cells, it is an important issue to reduce the heat quantity conducted from a cell having undergone an abnormal heat generation to a normal cell while keeping a sufficient mounting efficiency of the cells.

In a battery module including a plurality of cells, the heat quantity conducted from a cell having undergone an abnormal heat generation due to thermal runaway to its adjacent normal cell must be reduced, and the heat conduction from the cell having undergone thermal runaway must be prevented. In a conventional typical battery holder, the holes of the accommodation portions have a true circular shape, so that the contact surface area between the inner surface of each hole and the cylindrical cell accommodated in the hole of the accommodation portion is large. Therefore, when some cells have undergone an abnormal heat generation due to thermal runaway, heat is apt to be conducted from the some cells to their adjacent normal cells. While, a cylindrical cell accommodated in a first accommodation portion having a substantially hexagonal hole is in contact with the inner wall (battery holder) of the hole only at six points, so that the contact surface area with the holder is smaller than that with the conventional battery holder. Also regarding a cylindrical cell accommodated in a second accommodation portion having a substantially polygonal (heptagonal or more) hole, the contact surface area with the holder is smaller than that with the conventional battery holder. Therefore, the heat quantity conducted from a cell having undergone an abnormal heat generation to its adjacent normal cell can be reduced. However, the contact between the battery holder and the cylindrical cells is kept, so that the temperatures of the cells during a normal operation of the module can be equalized similarly to the conventional art. Furthermore, the first accommodation portions and second accommodation portions are arranged in a manner of log pile (or a staggered manner, or a zigzag pattern) by disposing the second accommodation portions on the opposite sides in the battery holder. Therefore, overhanging of the accommodation portions to the outside of the battery holder is suppressed, and the battery holder can be made smaller than the case that the battery holder is formed of only the first accommodation portions, for example.

When the battery holder is made of a resin material, a resin material in which a filler having an endothermic effect is contained in a resin as the matrix is used. Thus, the battery holder can produce the endothermic effect, and the endothermic amount can be increased by increasing the content of the filler. Therefore, the heat quantity conducted from a cell having undergone an abnormal heat generation to its adjacent normal cell can be reduced.

Hereinafter, one example of the exemplary embodiment of the present disclosure is explained in detail. The battery module of the present disclosure is not limited to the exemplary embodiment explained below. The drawings referred to by the explanation of the exemplary embodiment are shown schematically. For example, the size ratio between the components shown in the drawings must be determined with reference to the following explanation. In the present description, when "substantially" is explained by taking "substantially the same" as an example, the "substantially the same" includes things recognized as not only "completely the same" but also "essentially the same".

Hereinafter, for convenience of explanation, the direction in which the first accommodation portions of the battery holder are aligned and the second accommodation portions are aligned (namely, the extending directions of the first column and second column) is set as "lateral direction" of the battery holder or the like. The direction in which the first column and second column are arranged in parallel is set as "longitudinal direction" of the battery holder or the like. The direction along the axes of the first accommodation portions and second accommodation portions is set as "vertical direction" of the battery holder or the like. The positive electrode terminal side of the cells is set as "upper" side.

Figure 1:
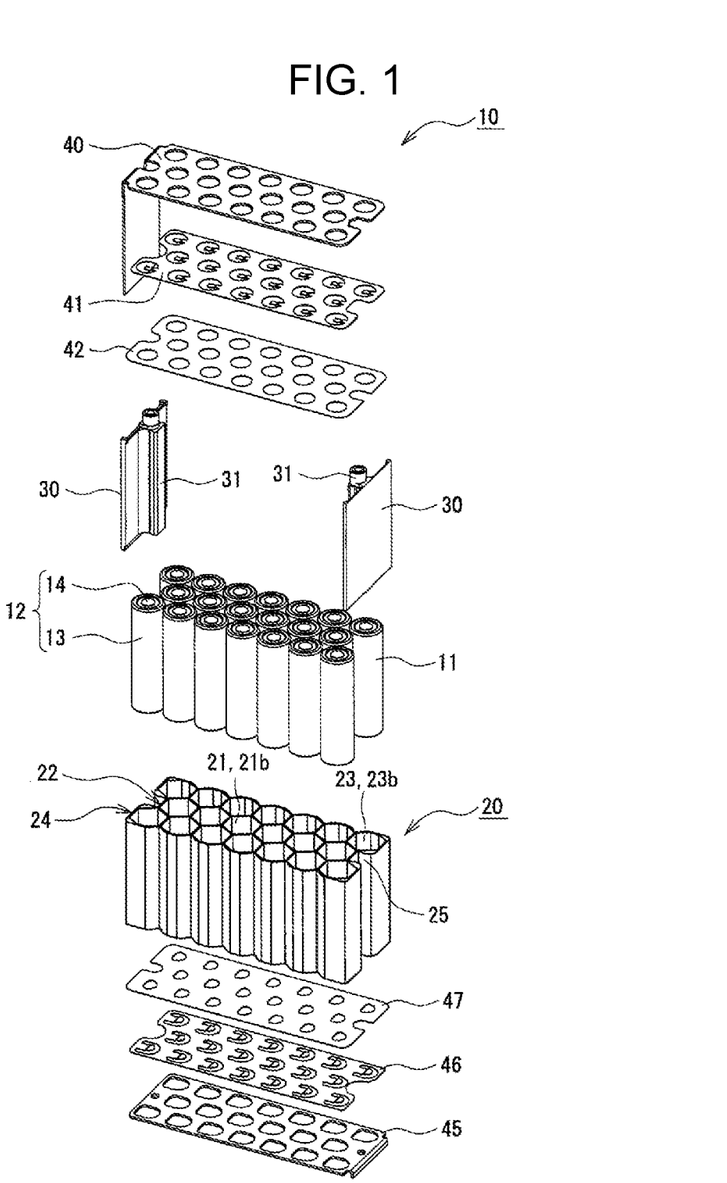
FIG. 1 is an exploded perspective view showing the whole configuration of a battery module in one example of an exemplary embodiment.

FIG. 1 is a perspective view of battery module 10 in one example of the exemplary embodiment. As shown in FIG. 1, battery module 10 includes: a plurality of cylindrical cells 11; and battery holder 20 including a plurality of tubular accommodation portions for respectively accommodating cylindrical cells 11. Battery holder 20 includes, as the accommodation portions, a plurality of first accommodation portions 21 each of which has a substantially hexagonal hole 21b and a plurality of second accommodation portions 23 each of which has a substantially polygonal (heptagonal or more) hole 23b. It is preferable that the shape of hole 23b of each second accommodation portion 23 is a substantially heptagonal shape as shown in FIG. 1. However, the shape may be a substantially octagonal shape, a substantially nonagonal shape, or a substantially dodecagonal shape, for example.

Each cylindrical cell 11 includes metal cell case 12 and a power generating element accommodated in the case. The power generating element includes an electrode body having a wound structure, for example, and a non-aqueous electrolyte. Cell case 12 includes bottomed cylindrical case body 13 for accommodating the power generating element, and sealing body 14 for blocking the opening of case body 13. A gasket (not shown) is disposed between case body 13 and sealing body 14. Sealing body 14 has a stacked structure including a valve body, and a cap, for example, and serves as the positive electrode terminal of cylindrical cell 11. Case body 13 of cylindrical cell 11 serves as the negative electrode terminal. When electrical insulation between cylindrical cell 11 and battery holder 20 is required, the outer peripheral side-surface of case body 13 is covered with an insulating resin film, and the bottom surface of case body 13 serves as the negative electrode terminal.

Figure 2:
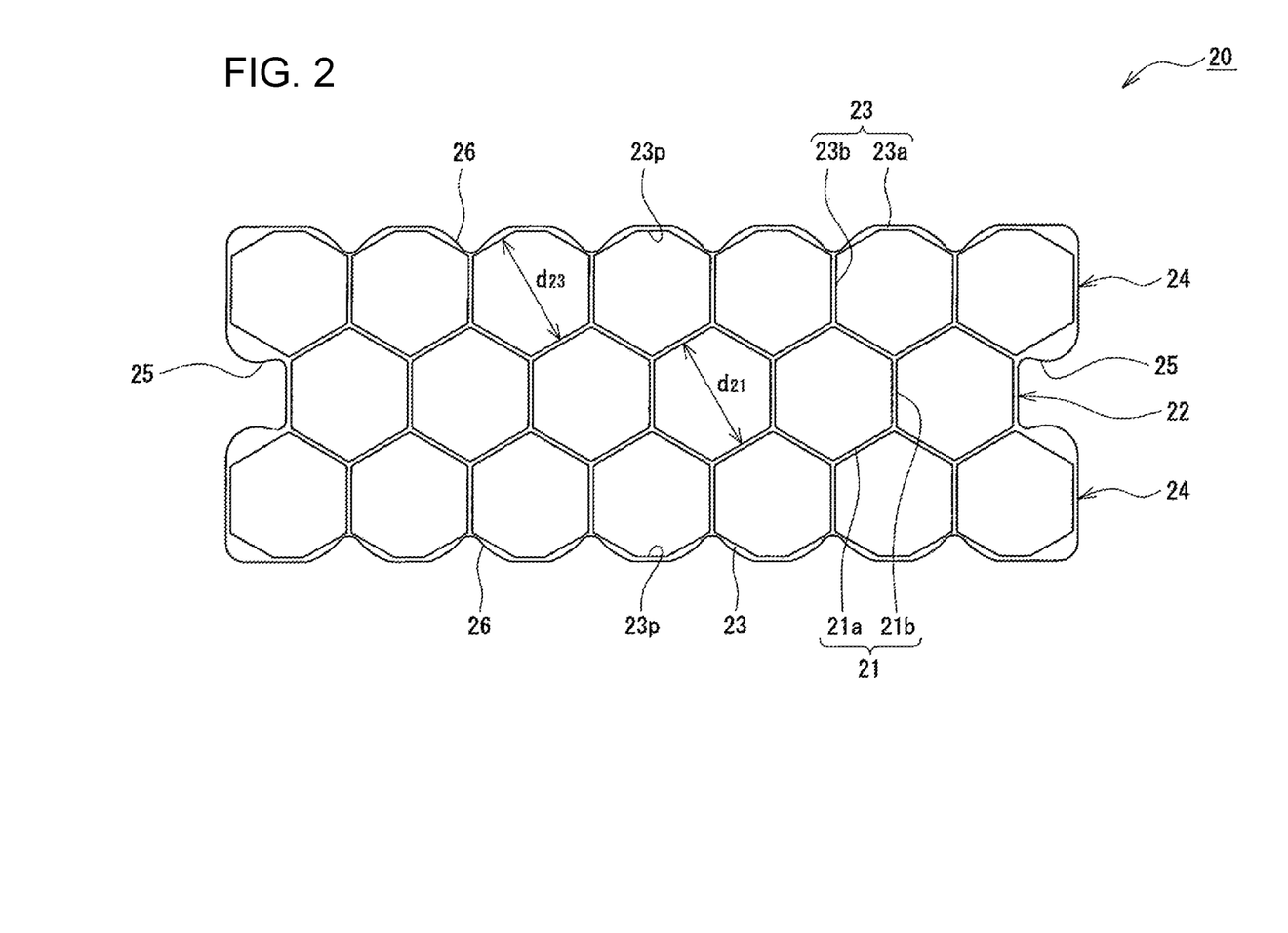
FIG. 2 is a plan view of a battery holder in the one example of the exemplary embodiment.

As discussed above, battery holder 20 is a block-shaped member including a plurality of first accommodation portions 21 and a plurality of second accommodation portions 23. Each first accommodation portion 21 is configured of partitions 21a (FIG. 2 shown below) and hole 21b, and each second accommodation portion 23 is configured of partitions 23a and hole 23b. One cylindrical cell 11 is accommodated in each of holes 21b and 23b. All of first accommodation portions 21 and second accommodation portions 23 extend vertically, and are arranged in substantially parallel. All of holes 21b and 23b are punched vertically.

Battery holder 20 includes first column 22 configured of a plurality of first accommodation portions 21, and second columns 24 each configured of a plurality of second accommodation portions 23. First column 22 is configured by arranging the plurality of first accommodation portions 21 laterally in line, and each second column 24 is configured by arranging the plurality of second accommodation portions 23 laterally in line. Although the details will be described later, second columns 24 are disposed on the opposite sides in battery holder 20 so that first column 22 is sandwiched between second columns 24. Battery holder 20 has a shape longer in the lateral direction than in the longitudinal direction. However, the longitudinal length may be substantially equal to the lateral length, or the longitudinal length may be longer than the lateral length.

The vertical length of battery holder 20 (vertical length of each accommodation portion) is substantially equal to the vertical length of cylindrical cells 11, but may be shorter than the vertical length of cylindrical cells 11. Recess 25 used for attaching post 30 described later is formed along the vertical direction at each of the opposite ends of battery holder 20 in the lateral direction. Battery holder 20 is manufactured by extrusion molding or casting, for example. However, battery holder 20 can be manufactured by preparing a plurality of tubular accommodation portions and bonding them together.

Preferably, in order to equalize the heats of cylindrical cells 11 during a normal operation of battery module 10, battery holder 20 is made of a material of high thermal conductivity. Suitable examples of the material include a metal such as aluminum or aluminum alloy, ceramic such as aluminum nitride, and a resin containing a filler of high thermal conductivity. Examples of the filler of high thermal conductivity include metal oxide (for example, aluminum oxide or zinc oxide), metal hydroxide (for example, aluminum hydroxide), metal nitride (for example, aluminum nitride or boron nitride), and acid metal nitride (for example, acid aluminum nitride). The filler of high thermal conductivity may be fiber of copper, niobium, tantalum, molybdenum, or tungsten.

Battery holder 20 must reduce the heat quantity that is conducted from cylindrical cell 11 having undergone an abnormal heat generation due to thermal runaway to its adjacent normal cylindrical cell 11. Therefore, when battery holder 20 is made of a resin material, it is necessary to employ a resin material having an endothermic amount. The endothermic amount of a resin serving as a matrix available for battery holder 20 is generally considered as "0", so that the endothermic amount of battery holder 20 depends on the endothermic amount of the filler. In battery holder 20 made of a resin material, therefore, the endothermic amount of the resin material per unit mass must be increased to a required value or higher, by increasing the endothermic amount of the resin material by mixing a filler having an endothermic effect into a resin serving as a matrix. Each of cylindrical cells 11 accommodated in battery holder 20 is assumed to be a secondary cell of high capacity, for example, a lithium-ion secondary cell of 18650 size or more. However, the capacity of the secondary cell is increased, and, for example, the secondary cell has a capacity of about 3000 mAh. Therefore, the endothermic amount of the resin material constituting battery holder 20 must be 500 J/g or more.

Furthermore, in order to increase the energy density, it is necessary to arrange cylindrical cells 11 as densely as possible in battery module 10. Therefore, the thickness of partitions 21a and 23a of the accommodation portions of battery holder 20 must be decreased. In the case that battery holder 20 is molded by injecting the resin material into a container as a die of battery holder 20, the fluidity (viscosity) of the employed resin material is one important requirement to keep the moldability. When the content of the filler in the resin as the matrix is high, the viscosity of the resin material is high and the molding is difficult. A method of molding battery holder 20 includes a method of molding it using a clay-like resin and a method of molding it using a liquid resin. When battery holder 20 is molded of a liquid resin, the viscosity must be a required value, namely 10 Pa·s or less.

Therefore, the endothermic amount and viscosity of the resin material used for battery holder 20 are determined on the basis of the content of the filler in the matrix resin. The lower limit of the content of the filler is determined on the basis of the endothermic amount, and the upper limit of the content of the filler is determined on the basis of the viscosity.

As discussed above, the resin material suitable for battery holder 20 is a material containing a filler that is thermally decomposed due to an abnormal heat generation of a cell and produces an endothermic effect. For example, a candidate of the matrix includes urethane or silicone, and a candidate of the filler includes sodium hydrogen carbonate or aluminum hydroxide. The endothermic amount of each of sodium hydrogen carbonate and aluminum hydroxide is about 1000 J/g, but the endothermic reaction temperature of sodium hydrogen carbonate is about 150° C., and the endothermic reaction temperature of aluminum hydroxide is about 250° C. Therefore, when a filler of sodium hydrogen carbonate is used, the filler causes an endothermic reaction against an abnormal heat generation of a cell in a larger range of battery holder 20 than when a filler of aluminum hydroxide is used, and the endothermic effect is higher. As a filler having an endothermic effect, magnesium hydroxide or calcium carbonate is also used, and the endothermic reaction temperatures of magnesium hydroxide and calcium carbonate are 370° C. and 670° C., respectively. Therefore, when a filler of sodium hydrogen carbonate, aluminum hydroxide, or magnesium hydroxide is used, a sufficient endothermic effect can be expected to be exerted against an abnormal heat generation of a cell.

Battery module 10 includes a pair of posts 30 to be attached to battery holder 20. Posts 30 are plate-shaped members that cover the end surfaces of battery holder 20 in the lateral direction, and each post 30 has projection 31 on its surface. Posts 30 are arranged on the opposite sides of battery holder 20 so that projections 31 face battery holder 20. Each projection 31 has a shape fitting into recess 25 of battery holder 20, and is inserted into recess 25 from the upside or downside of battery holder 20.

On battery holder 20, lead plate 41 electrically connected to the positive electrode terminals of the plurality of cylindrical cells 11 is disposed. On lead plate 41, positive-side current collector 40 electrically connected to lead plate 41 is disposed. Under battery holder 20, lead plate 46 electrically connected to the negative electrode terminals of the plurality of cylindrical cells 11 is disposed. Under lead plate 46, negative-side current collector 45 electrically connected to lead plate 46 is disposed. Cylindrical cells 11 are interconnected in parallel via lead plates 41 and 46. At least one of lead plates 41 and 46 may have a fuse.

Between battery holder 20 and lead plate 41 (or 46), insulating plate 42 (or 47) having holes for exposing terminal portions of cylindrical cells 11 is disposed. Positive-side current collector 40 and negative-side current collector 45 are fixed to the pair of posts 30 using screws (not shown), for example. Battery module 10 is connected in series to another battery module 10 adjacent to it using positive-side current collector 40 and negative-side current collector 45, for example.

Figure 3:
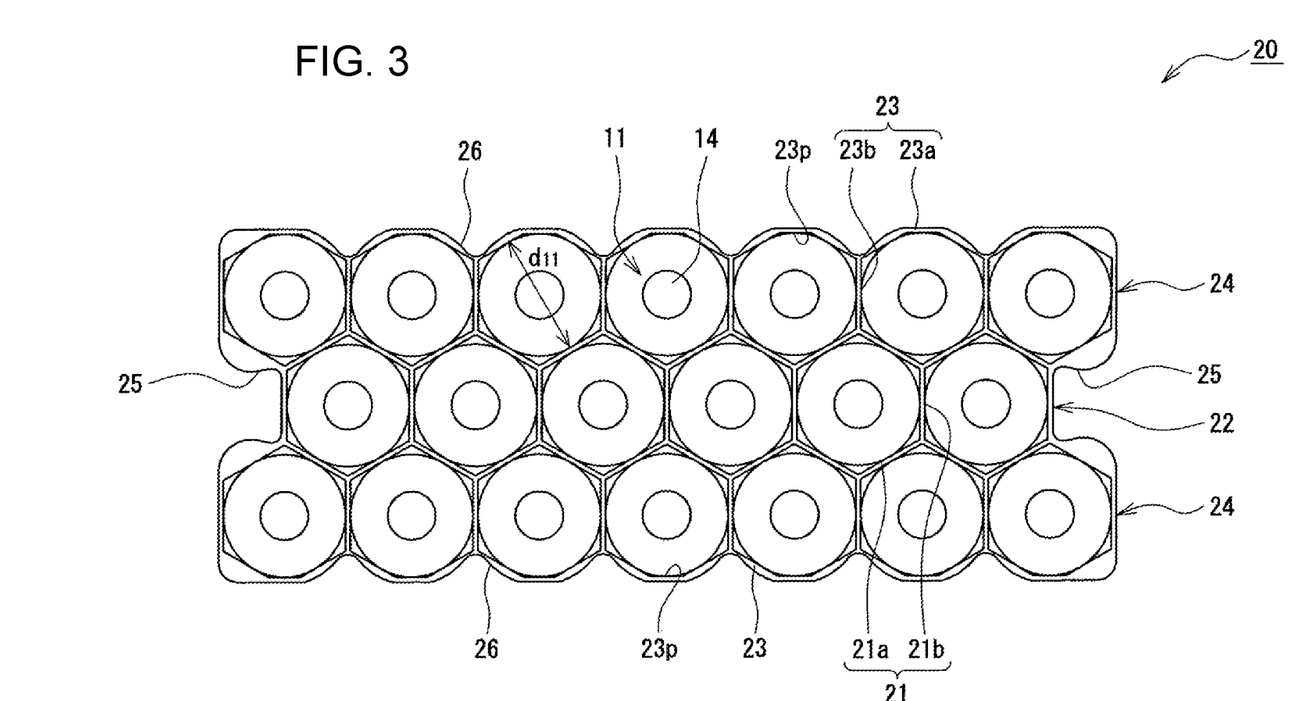
FIG. 3 is a plan view showing the state in which cylindrical cells are accommodated in the battery holder in the one example of the exemplary embodiment.

Hereinafter, battery holder 20 is described in more detail with reference to FIG. 2 and FIG. 3. FIG. 2 and FIG. 3 are plan views of battery holder 20 (FIG. 3 shows the state in which cylindrical cells 11 are accommodated).

As shown in FIG. 2 and FIG. 3, battery holder 20 includes one first column 22 configured by laterally aligning six first accommodation portions 21, and two second columns 24 each configured by laterally aligning seven second accommodation portions 23. Each of first column 22 and second columns 24 is configured by arranging the accommodation portions laterally in line. In order to arrange first accommodation portions 21 and second accommodation portions 23 in a manner of log pile (or a staggered manner, or a zigzag pattern), second columns 24 are disposed on the opposite end sides of battery holder 20 in the longitudinal direction so that first column 22 is sandwiched between second columns 24.

The number of first columns 22 may be two or more. In this case, first accommodation portions 21 constituting first columns 22 are arranged in a manner of log pile (or a staggered manner, or a zigzag pattern). Also in the case that a plurality of first columns 22 are used, second columns 24 are disposed on the opposite end sides of battery holder 20 in the longitudinal direction so that the plurality of first columns 22 are sandwiched between second columns 24. The number of accommodation portions constituting each column is not particularly limited. The number of first accommodation portions 21 constituting each first column 22 may be larger than the number of second accommodation portions 23 constituting each second column 24.

Each first accommodation portion 21, as discussed above, includes partitions 21a and hole 21b, and the shape of hole 21b is a substantially hexagonal shape. Here, the shape of hole 21b means the shape of first accommodation portion 21 in the plan view, or a cross sectional shape when first accommodation portion 21 is cut by the plane along the longitudinal direction and lateral direction (the same is true for hole 23b). Partitions 21a are walls for separating adjacent first accommodation portions 21 from each other and separating first accommodation portion 21 from its adjacent second accommodation portions 23. Partition 21a existing between two first accommodation portions 21 is shared by them. Partition 21a existing between first accommodation portion 21 and second accommodation portion 23 is shared by them, and is also called partition 23a. Partitions 21a located at the opposite ends of first column 22 define the side walls of battery holder 20.

Preferably, the lengths of the sides along the limb of hole 21b of each first accommodation portion 21 are equal to each other, and hence hole 21b has a regularly hexagonal shape. The shapes and sizes of holes 21b of the plurality of first accommodation portions 21 are substantially the same, respectively. First column 22 is formed by aligning first accommodation portions 21 so that the centers of holes 21b are located on the same straight line. Interval $d_{21}$ between two sides facing each other along the limb of hole 21b is substantially the same as diameter $d_{11}$ of cylindrical cell 11 accommodated in hole 21b of first accommodation portion 21. In more detail, preferably, interval $d_{21}$ is slightly larger than diameter $d_{11}$, and is close to diameter $d_{11}$ within a range that does not affect the insertion of cylindrical cell 11 into hole 21b.

Cylindrical cell 11 is accommodated in hole 21b of first accommodation portion 21 so as to be in contact with the inner walls of hole 21b (inner surfaces of partitions 21a) at a maximum of six points in the peripheral direction of the cell. On each of six partitions 21a defining first accommodation portion 21, the point being in contact with cylindrical cell 11 is located at substantially the same distance from the corners of first accommodation portion 21 which are disposed at the opposite ends of each partition 21a. In other words, the point on each inner wall which is in contact with cylindrical cell 11 is located at substantially the same distance from two corners of hole 21b which are disposed at the opposite ends of the inner wall. In other words, the periphery of cylindrical cell 11 is in contact with partitions 21a at a regular interval. Here, by deforming the shape of hole 21b in consideration of the heat conduction from cylindrical cell 11 to battery holder 20, the following configuration may be formed in which all of the six points on the inner walls of hole 21b are not in contact with cylindrical cell 11. By forming, on an inner wall of hole 21b, a point that is not in contact with cylindrical cell 11, the heat conducted to its adjacent cylindrical cell 11 in the direction toward the point can be reduced.

Each second accommodation portion 23, as discussed above, includes partitions 23a and hole 23b, and hole 23b has a substantially heptagonal shape. Partitions 23a are walls for separating adjacent second accommodation portions 23 from each other and separating first accommodation portion 21 from its adjacent second accommodation portions 23. Partition 23a existing between two second accommodation portions 23 is shared by them. Partition 23a existing between first accommodation portion 21 and second accommodation portion 23 is shared by them. Partitions 23a located at the ends of battery holder 20 define the side walls of battery holder 20. On the opposite end surfaces of battery holder 20 in the longitudinal direction, a plurality of recesses 26 based on the shapes of second accommodation portions 23 are formed at a substantially regular interval.

The thickness of partitions 21a and 23a is set close to the minimum necessary for exhibiting a necessary function, for example 1 mm or less. Battery holder 20 is designed to increase the energy density of battery module 10.

Battery holder 20 may be molded, using a resin material containing, in a rein matrix, a filler that causes an endothermic reaction against an abnormal heat generation of a cell. The filler is selected with an emphasis on the endothermic amount and endothermic reaction temperature. As the material of the filler, a material having a large endothermic amount and a low endothermic reaction temperature is suitable, for example, sodium hydrogen carbonate, aluminum hydroxide, or magnesium hydroxide is suitable. As battery holder 20, a thermosetting resin that does not melt even when it is exposed to the high temperature of the abnormal heat generation of the cell is suitable.

As a candidate for the thermosetting resin, for example, unsaturated polyester, urethane, or silicone is considered. Unsaturated polyester is employed when battery holder 20 is molded by pressing a clay-like resin into a die and hardening it. Urethane and silicone are employed when battery holder 20 is molded by injecting a liquid resin into the gaps between the arranged cells and hardening it. When battery holder 20 is molded by injecting the liquid resin and hardening it, a suitable matrix of the resin material is a thermosetting resin having the following properties:

the temperature of cylindrical cell 11 does not increase to a value causing the degradation; and a fluidity required for molding battery holder 20 is kept before the hardening.

Preferably, even if the thermosetting resin of the matrix constituting battery holder 20 is exposed to a high temperature of 700° C. or more, the thermosetting resin is carbonized, without melting, to keep the partitions of the accommodation portions. Specific examples of the thermosetting resin include not only the above-mentioned resin, but also epoxy resin, melamine resin, and phenol resin.

The resin material constituting battery holder 20 allows battery holder 20 to be molded so that the reproducibility of the shapes of battery holder 20 and partitions 21a and 23a is high. That is because the lower limit of the content of the filler is determined on the basis of the endothermic amount, and the upper limit of the content of the filler is determined on the basis of the viscosity. The molded battery holder 20 keeps a required endothermic amount.

The shape of a half of second accommodation portion 23 on the first accommodation portion 21 side, namely the shape of an inside half of hole 23b (hereinafter referred to as "the shape of the inside half of hole 23b"), is substantially the same as the shape of hole 21b formed when first accommodation portion 21 is equally divided into two along second column 24. In other words, the shape of the inside half of hole 23b in the plan view is substantially the same as the shape obtained by equally dividing a regularly hexagonal shape into two along the line interconnecting the centers of two sides facing each other. Thus, a part of second accommodation portion 23 is fitted into a recess formed between two adjacent first accommodation portions 21, and hence first accommodation portions 21 and second accommodation portions 23 can be efficiently arranged in a manner of clear log pile (or a clear staggered manner, or a clear zigzag pattern).

Preferably, the lengths of inside four sides along the limb of hole 23b are equal to each other, and, of the remaining three sides, the lengths of two sides crossing the lateral direction are equal to each other. Similarly to the case of first accommodation portions 21, the shapes and sizes of holes 23b of the plurality of second accommodation portions 23 are substantially the same, respectively. Second column 24 is configured by arranging second accommodation portions 23 so that the centers of holes 23b (the centers of cylindrical cells 11 inserted into holes 23b) are located on the same straight line. Interval $d_{23}$ between two sides facing each other along the limb of hole 23b is substantially the same as diameter $d_{11}$ of cylindrical cell 11 accommodated in hole 23b of second accommodation portion 23. In more detail, preferably, interval $d_{23}$ is slightly larger than diameter $d_{11}$ and is close to diameter $d_{11}$ within a range that does not affect the insertion of cylindrical cell 11 into hole 23b.

Cylindrical cell 11 is accommodated in hole 23b of second accommodation portion 23 so as to be in contact with the inner walls of hole 23b (partitions 23a) at a maximum of seven points in the peripheral direction of the cell. On each of seven partitions 23a defining second accommodation portion 23, the point being in contact with cylindrical cell 11 is located at substantially the same distance from the corners of second accommodation portion 23 which are disposed at the opposite ends of each partition 23a. In other words, the point on each inner wall which is in contact with cylindrical cell 11 is located at substantially the same distance from two corners of hole 23b which are disposed at the opposite ends of the inner wall. On the outside (the end side in the longitudinal direction) of hole 23b, the contact surface area between cylindrical cell 11 and the inner wall is larger than on the inside of hole 23b. On the inside of hole 23b, the contact state between cylindrical cell 11 and the inner wall of hole 23b is similar to that in the case of first accommodation portion 21. In the example shown in FIG. 3, cylindrical cell 11 is in contact with inner wall 23p that is located on the most end side in the longitudinal direction, of the inner walls of hole 23b. However, the following configuration may be employed in which partitions 23a on the opposite sides of inner wall 23p are made long to prevent inner wall 23p from coming into contact with cylindrical cell 11. By deforming the shape of hole 23b in consideration of the heat conduction from cylindrical cell 11 to battery holder 20, the following configuration may be formed in which all of the seven points on the inner walls of hole 23b are not in contact with cylindrical cell 11. By forming, on an inner wall of hole 23b, a point that is not in contact with cylindrical cell 11, the heat conducted to its adjacent cylindrical cell 11 in the direction toward the point can be reduced.

Inner walls 23p (the inner surfaces of partitions 23a located on the most end side in the longitudinal direction) are formed along each second column 24, and the outer surfaces of partitions 23a defining inner walls 23p are also formed along each second column 24. Each of the end surfaces of battery holder 20 in the longitudinal direction includes flat surfaces along the lateral direction corresponding to these partitions 23a, and has an uneven shape in which the flat surfaces and recesses 26 formed between second accommodation portions 23 are repeated. Partitions 23a along recesses 26 are made thicker than other partitions 23a on the condition that they do not overhang to the outside of the flat surfaces along the lateral direction. Some parts of partitions 23a of second accommodation portions 23 located at the opposite ends of each second column 24 are made further thick. In this case, the thermal capacity of battery holder 20 can be increased while a sufficient mounting efficiency of cylindrical cell 11 is kept. When the thermal capacity of battery holder 20 is increased, temperature increase of the holder during an abnormal heat generation can be suppressed, and the heat quantity conducted to a normal cell can be reduced.

The longitudinal length from the center of hole 23b to inner wall 23p is shorter than the longitudinal length from the center of hole 21b to the corner of hole 21b that is located on the most end side in the longitudinal direction. Therefore, by disposing second accommodation portions 23 on the opposite end sides of battery holder 20 in the longitudinal direction, the holder can be downsized compared with the case that the holder is formed of only first accommodation portions 21.

First accommodation portions 21 and second accommodation portions 23 are arranged in a manner of log pile (or a staggered manner, or a zigzag pattern) so that they are shifted by a half pitch. As discussed above, second accommodation portion 23 is partially fitted into a recess formed between two adjacent first accommodation portions 21. Four partitions 21a of each first accommodation portion 21 are shared by second accommodation portions 23 constituting second columns 24. The number of second accommodation portions 23 constituting each second column 24 is one larger than the number of first accommodation portions 21 constituting first column 22. Therefore, second accommodation portions 23 disposed on the opposite end sides of battery holder 20 in the lateral direction overhang from the ends of first accommodation portions 21 by substantially half the length. Thus, recesses 25 are formed on the opposite end surfaces of battery holder 20 in the lateral direction.

As discussed above, battery module 10 includes battery holder 20 in which first accommodation portions 21 each having a substantially hexagonal hole 21b and second accommodation portions 23 each having a substantially heptagonal hole 23b are arranged in a manner of log pile (or a staggered manner, or a zigzag pattern). In battery holder 20 having such a configuration, the contact surface area between battery holder 20 (partition) and cylindrical cell 11 accommodated in each accommodation portion can be reduced. The heat quantity that is conducted from a cell having undergone an abnormal heat generation to a normal cell can be reduced while a sufficient mounting efficiency of cylindrical cells 11 is kept. Therefore, battery module 10 has a high fire-spreading prevention performance.

A thermosetting resin is employed as the matrix of battery holder 20. The thermosetting resin constituting the matrix of battery holder 20 is carbonized at a temperature at which cylindrical cell 11 has undergone an abnormal heat generation due to thermal runaway, and a filler contained in the thermosetting resin may be decomposed to generate gas. The carbonization of the thermosetting resin and the gas generation from the filler decreases the volume of the partition of the accommodation portion of battery holder 20 that accommodates cylindrical cell 11 having undergone thermal runaway, thereby expanding the clearance between the accommodation portion of battery holder 20 and cylindrical cell 11. However, the clearance is restricted to a minimum in consideration of the tolerance of the accommodation portion of battery holder 20 and the tolerance of cylindrical cell 11. In a normal state, the thermal conductivity between cylindrical cell 11 and the accommodation portion secures the equalization of heat and a required amount of heat radiation.

When an abnormal heat generation of cylindrical cell 11 due to thermal runaway has deformed the thermosetting resin constituting battery holder 20 and hence has expanded the clearance between the accommodation portion of battery holder 20 and cylindrical cell 11, the clearance suppresses the conduction of the heat generated from cylindrical cells 11 to battery holder 20. Therefore, the heat generation hardly affects its adjacent cylindrical cell 11, and the thermal runaway is more effectively prevented from propagating to adjacent cylindrical cell 11.

Using a thermosetting resin for the matrix of battery holder 20 prevents melting of the partitions of the accommodation portions. Thus, the following accidents are prevented: cylindrical cell 11 having undergone thermal runaway comes into contact with its adjacent cylindrical cell 11; and the adjacent cylindrical cell 11 is directly exposed to the gas ejected from cylindrical cell 11 having undergone thermal runaway.

Figure 4:
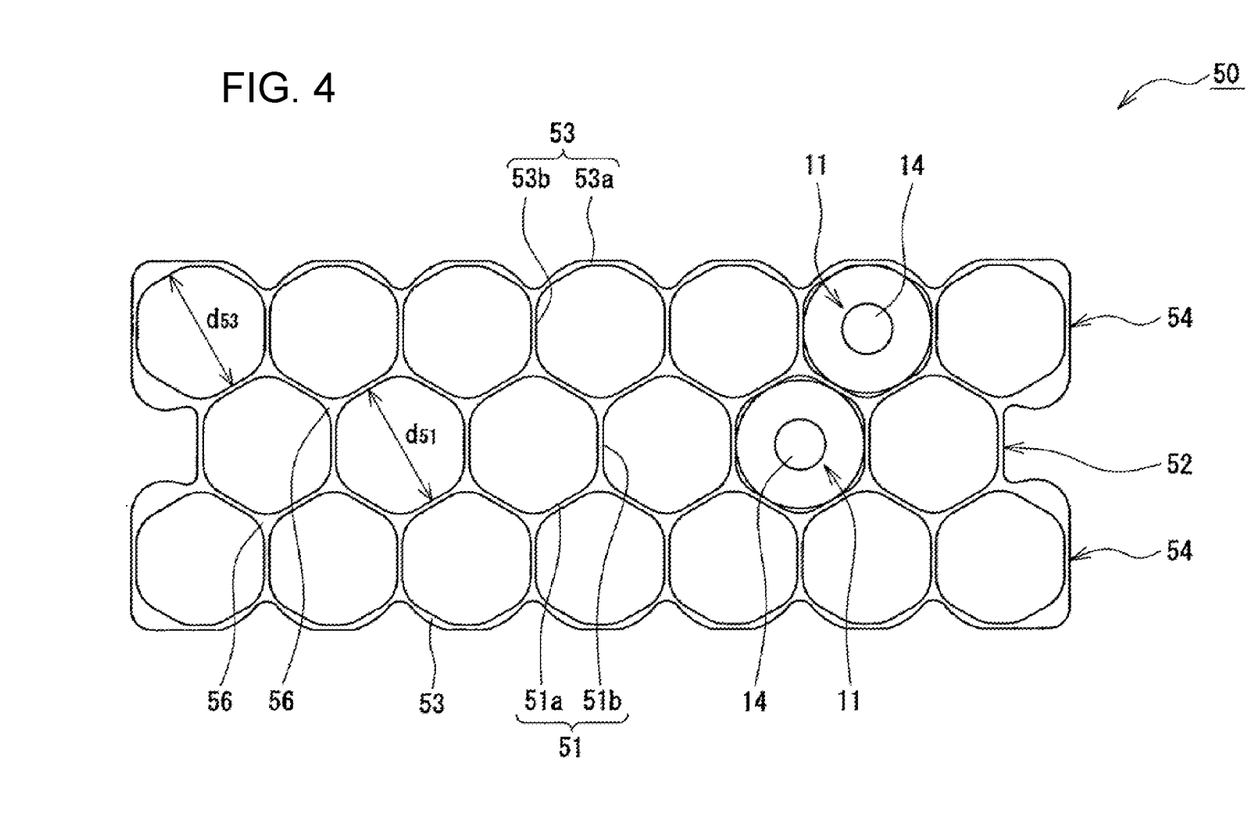
FIG. 4 is a plan view of a battery holder in another example of the exemplary embodiment.

FIG. 4 is a plan view of battery holder 50 in another example of the exemplary embodiment. As shown in FIG. 4, similarly to battery holder 20, battery holder 50 includes: one first column 52 formed by aligning a plurality of first accommodation portions 51 each having a substantially hexagonal hole 51b; and two second columns 54 each formed by aligning a plurality of second accommodation portions 53 each having a substantially heptagonal hole 53b. Each first accommodation portion 51 is formed of partitions 51a and hole 51b, and each second accommodation portion 53 is formed of partitions 53a and hole 53b. One cylindrical cell 11 is accommodated in each of holes 51b and 53b. Differently from battery holder 20, at the corners of hole 51b of each first accommodation portion 51 and the corners of hole 53b of each second accommodation portions 53, thick portions 56 overhanging toward the inside of hole 51b and 53b are formed so that thick portions 56 do not come into contact with cylindrical cells 11. The inner surface of each thick portion 56 is curved toward the outside of the accommodation portion so as not to come into contact with cylindrical cell 11, and the corners of each accommodation portion is rounded. Forming thick portions 56 can further increase the thermal capacity of the battery holder while keeping a sufficient mounting efficiency of cylindrical cells 11.

In the case that a battery holder is made of a resin material containing a filler, the present disclosure is not limited to the shape of the battery holder shown in the exemplary embodiment. The setting of the content of the filler can be also applied to a battery holder in another exemplary embodiment, and this setting is applicable even when each accommodation portion for accommodating the cell in the battery holder has a cylindrical shape as shown in FIG. 5 described later.

Figure 5:
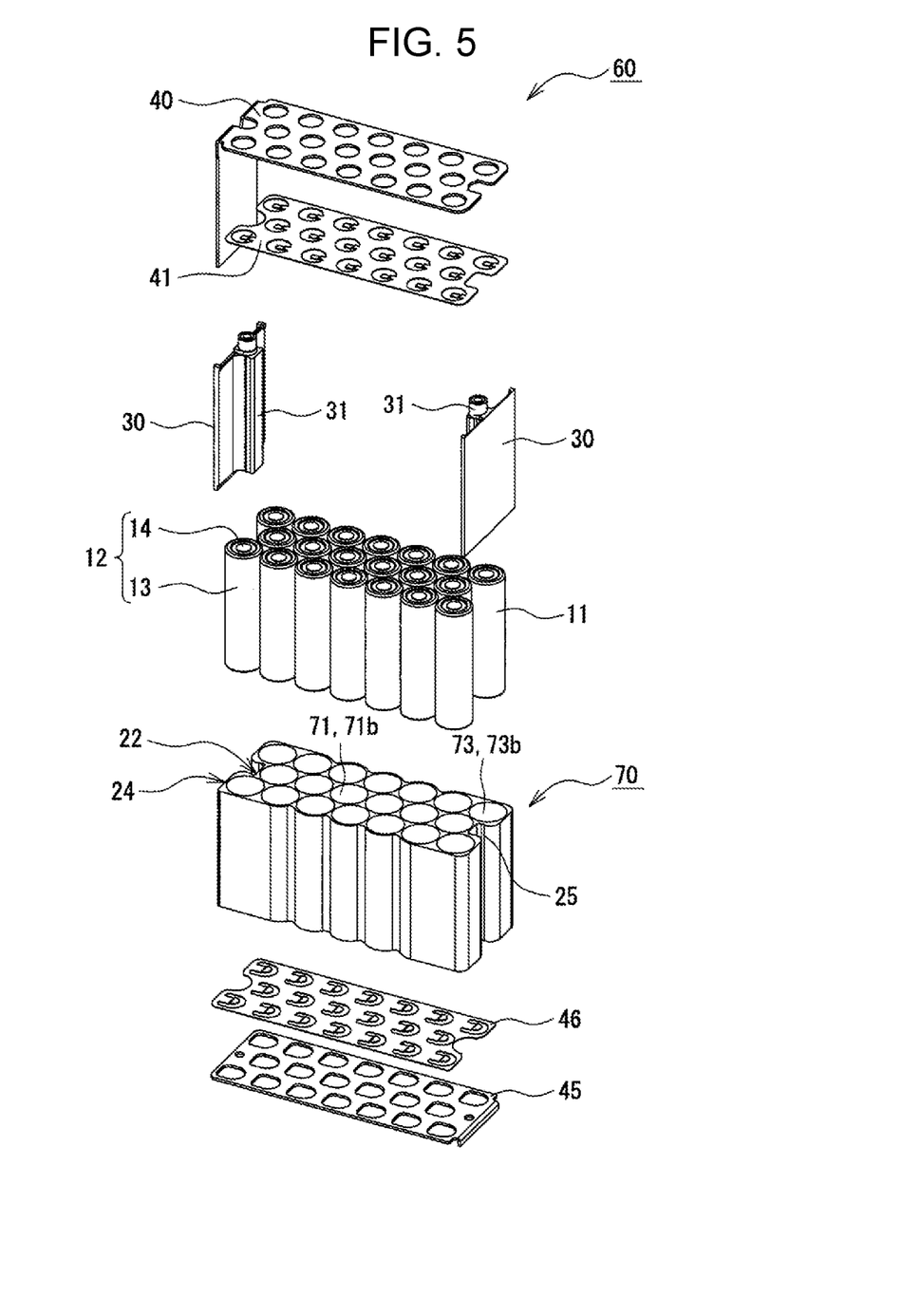
FIG. 5 is an exploded perspective view showing the whole configuration of a battery module in another example of the exemplary embodiment.

In battery module 60 shown in FIG. 5, both the shape of hole 71b of each first accommodation portion 71 and the shape of hole 73b of each second accommodation portion 73 are substantially true circular shapes. Here, the shape of each hole means the shape of each accommodation portion in the plan view, or a cross sectional shape when each accommodation portion is cut by the plane along the longitudinal direction and lateral direction. Furthermore, differently from battery module 10, battery module 60 does not include insulating plate 42 or 47. In the case that battery holder 70 is made of a resin material, as shown in FIG. 5, a configuration in which an insulating plate is not disposed between each collector and the holder may be employed.

The invention claimed is:

1. A battery module comprising:
  a plurality of cylindrical cells; and
  a battery holder having a plurality of tubular accommodation portions for respectively accommodating the plurality of cylindrical cells,
  wherein the battery holder includes, as the plurality of accommodation portions:
    a plurality of first accommodation portions each having a substantially hexagonal hole; and
    a plurality of second accommodation portions each having a substantially polygonal hole including a seven or more sided hole, and
  wherein, in order to arrange the plurality of first accommodation portions and the plurality of second accommodation portions in a manner of log pile, second columns including the plurality of second accommodation portions are disposed on opposite sides in the battery holder so that a first column including the plurality of first accommodation portions is sandwiched between the second columns.

2. The battery module according to claim 1, wherein a hole shape of a half, on a first accommodation portion side, of each of the plurality of second accommodation portions is substantially the same as a hole shape of each of the plurality of first accommodation portions equally divided into two along the first column.

3. The battery module according to claim 2, wherein each of the plurality of second accommodation portions has a substantially heptagonal hole.

4. The battery module according to claim 1, wherein at corners of the hole of each of the plurality of first accommodation portions and the plurality of second accommodation portions, thick portions overhanging toward an inside of the hole are formed so that the thick portions do not come into contact with a corresponding one of the plurality of cylindrical cells.

5. The battery module according to claim 1, wherein a first partition of a second accommodation portion, of the plurality of second accommodation portions, located at an end of the battery holder has a thick portion thicker than a partition other than the first partition of the second accommodation portion.

6. The battery module according to claim 1, wherein the battery holder is made of a resin material containing a filler in a resin matrix, and
  in the resin material, a lower limit of a content of the filler is determined based on an endothermic amount, and an upper limit of the content of the filler is determined based on a viscosity.

* * * * *